UNITED STATES PATENT OFFICE.

CHARLES HATCH EHRENFELD AND JACOB ROSS GROVE, OF YORK, PENNSYLVANIA.

METHOD AND PROCESS FOR THE RECOVERY OF COPPER AND OTHER METALS FROM THEIR ORES.

No. 866,849.   Specification of Letters Patent.   Patented Sept. 24, 1907.

Application filed September 7, 1906. Serial No. 333,624.

*To all whom it may concern:*

Be it known that we, CHARLES HATCH EHRENFELD and JACOB ROSS GROVE, citizens of the United States, residing at York, in the county of York and State of Pennsylvania, have invented certain new and useful Improvements in Methods and Processes for the Recovery of Copper and other Metals from Their Ores, of which the following is a specification.

Having invented certain new and useful improvements in method and process for the recovery of metals from their ores, we have prepared the following specification particularly describing our invention, by which anyone skilled in the art may be enabled to use the same.

Our invention relates to that class of methods and processes whereby the metal is dissolved out of the ore into a solution of a suitable solvent agent, either with or without the aid of electricity, and is electrically deposited therefrom. Its object is to provide an economical method and process for the recovery of copper and other metals from their ores.

A further object is to provide a new and heretofore unused process for preparing sulfid ores for further treatment.

Our invention consists in the hereinafter described method and process for the recovery of copper and other metals from their ores, as well as in such of the steps therein included as are new and heretofore unused.

In order to apply our invention we employ apparatus of ordinary and well known design; a grinding mill of ordinary design; a furnace of the reverberatory type, or of other gas utilizing design, for use in treating sulfid ores; a leaching tank; a deposition tank, such as is used in the electric refining of copper, provided with suitable anode rods or plates of carbon or other suitable material and suitable cathode plates.

To recover the metal from copper sulfid ore, for instance chalcopyrite, we pulverize the ore to about 30 mesh; we heat it in an atmosphere having a limited supply of oxygen, for the purposes, of expelling the sulfur, and of converting the metalliferous substances of the ore into the lower oxids of the metal; after the ore has been properly heated we dissolve the metal out of it, with or without the aid of electricity, into a solution of a suitable solvent agent, such as an aqueous solution of ammonium chlorid ($NH_4CL$), and afterwards electrically deposit the metal out of the solution.

In case we desire to dissolve the metal out of the ore and to deposit it simultaneously, we place the ore in bulk in the deposition tank with the solution, upon around or otherwise operatively contiguous to the anode; we then locate the cathode plate and energize the circuit and the metal is deposited upon the plate. We have found that mechanical circulation of the solution between the electrodes does not seem to facilitate the electrolysis or deposition, hence we do not employ it.

What we claim as new and desire to secure by Letters Patent is more particularly set forth in the following claims.

1. The method of recovering metal from sulfid ores of metals capable of forming various oxygen compounds which consists in; heating the ore in an atmosphere having a limited supply of oxygen, for the purposes of expelling sulfur and converting metalliferous substances of the ore into the lower oxygen compounds of the metal; dissolving the metal out of the ore into a solution of a suitable solvent agent; and electrically depositing the metal therefrom.

2. The method of recovering metal from sulfid ores of metals capable of forming various oxygen compounds which consists in; heating the ore in an atmosphere having a limited supply of oxygen, for the purposes of expelling sulfur and converting metalliferous substances of the ore into the lower oxygen compounds of the metal; dissolving the metal out of the ore by electrolysis into a solution of a suitable solvent agent; and electrically depositing the metal therefrom.

3. The process for the recovery of metal from sulfid ores of metals capable of forming various oxygen compounds which consists in; heating the ore in an atmosphere having a limited supply of oxygen for the purposes of expelling sulfur and converting metalliferous substances of the ore into the lower oxygen compounds of the metal; dissolving the metal out of the ore into an aqueous solution of ammonium chlorid; and electrically depositing the metal therefrom.

4. The process for the recovery of metal from sulfid ores of metals capable of forming various oxygen compounds which consists in; heating the ore in an atmosphere having a limited supply of oxygen for the purposes of expelling sulfur and converting metalliferous substances of the ore into the lower oxygen compounds of the metal; dissolving the metal out of the ore by electrolysis into an aqueous solution of ammonium chlorid; and electrically depositing the metal therefrom.

5. In a process for the recovery of metal from sulfid ores of metals capable of forming various oxygen compounds; heating the ore in an atmosphere having a limited supply of oxygen for the purposes of expelling sulfur and converting metalliferous substances of the ore into the lower oxygen compounds of the metal; dissolving out the metal.

6. The process for the recovery of copper from sulfid ores which consists in; heating the ore in an atmosphere having a limited supply of oxygen for the purposes of expelling sulfur and converting the copper of the ore into the lower oxygen compounds of copper; dissolving the metal out of the ore into an aqueous solution of a suitable solvent agent; and electrically depositing the metal therefrom.

7. The process for the recovery of copper from sulfid ores, which consists in; heating the ore in an atmosphere having a limited supply of oxygen for the purposes of expelling sulfur and converting the copper of the ore into the lower oxids of the copper; dissolving the metal out of the ore into an aqueous solution of a suitable solvent agent; and electrically depositing the metal therefrom.

8. The process for the recovery of metal from sulfid ores of metals capable of forming various oxygen compounds which consists in; heating the ore in an atmosphere having a limited supply of oxygen for the purposes of expelling sulfur and converting metalliferous substances of the ore into the lower oxygen compounds of the metal; placing the ore in bulk in a deposition bath, in a solution of a suitable solvent agent, upon, around or otherwise operatively contiguous to a suitable anode in operative relation with a suitable cathode, energizing the circuit and depositing the metal upon the cathode.

9. In a process for the recovery of metal from sulfid ores of metals capable of forming various oxygen compounds which consists in; heating the ore in an atmosphere having a limited supply of oxygen for the purposes of expelling sulfur and converting metalliferous substances of the ore into the lower oxygen compounds of the metal; placing the ore in bulk in a deposition bath in a solution of ammonium chlorid, upon, around or otherwise operatively contiguous to a suitable anode in operative relation with a suitable cathode; energizing the circuit and depositing the metal upon the cathode.

10. In a process for the recovery of metal from sulfid ores of metals capable of forming various oxygen compounds; heating the ore in an atmosphere having a limited supply of oxygen for the purpose of converting metalliferous substances of the ore into the lower oxygen compounds of the metal; dissolving the metal out of the ore into an aqueous solution of a suitable solvent agent; and electrically depositing the metal therefrom.

11. In a process for the recovery of metal from sulfid ores of metals capable of forming various oxygen compounds; heating the ore in an atmosphere having a limited supply of oxygen for the purposes of expelling sulfur and converting metalliferous substances of the ore into the lower oxids of the metal; dissolving the metal out of the ore into an aqueous solution of a suitable solvent agent; and electrically depositing the metal therefrom.

12. The method of recovering metal from sulfid ores of metals capable of forming more than one oxid which consists in; heating the ore in an atmosphere having a limited supply of oxygen so as to expel sulfur from metalliferous substances of the ore, and so as to convert said metalliferous substances into the lower oxids of the metal to be recovered; dissolving the metal out of the ore into a solution of a suitable solvent agent; and electrically depositing the metal therefrom.

13. The method of recovering metal from sulfid ores of metals capable of forming various oxygen compounds which consists in; heating the ore in an atmosphere having a limited supply of oxygen, so as to expel sulfur from metalliferous substances of the ore, and so as to introduce a predetermined proportion of oxygen into combination with said metalliferous substances; dissolving the metal out of the ore into a solution of a suitable solvent agent; and electrically depositing the metal therefrom.

14. The method of recovering metal from sulfid ores of metals capable of forming more than one oxid which consists in: heating the ore in an atmosphere having a limited supply of oxygen, so as to expel sulfur from metalliferous substances of the ore, and so as to introduce a predetermined proportion of oxygen into combination with said metalliferous substances; dissolving the metal out of the ore into a solution of a suitable solvent agent; and electrically depositing the metal therefrom.

In testimony whereof they affixed their signatures in presence of two witnesses

CHARLES HATCH EHRENFELD.
JACOB ROSS GROVE.

Witnesses:
RAYMOND T. SHIPLEY,
HENRY R. KRABER.